(12) United States Patent
Geng et al.

(10) Patent No.: US 10,628,633 B1
(45) Date of Patent: Apr. 21, 2020

(54) ENHANCING ELECTRONIC FORM DATA BASED ON HIERARCHICAL CONTEXT INFORMATION

(71) Applicant: Decision Engines, Inc., Palo Alto, CA (US)

(72) Inventors: Kunling Geng, Milpitas, CA (US); Sridhar Gunapu, Santa Clara, CA (US)

(73) Assignee: DECISION ENGINES, INC., Palo Alto, CA (US)

( * ) Notice: Subject to any disclaimer, the term of this patent is extended or adjusted under 35 U.S.C. 154(b) by 0 days.

(21) Appl. No.: 16/457,747

(22) Filed: Jun. 28, 2019

(51) Int. Cl.
  G06F 40/174 (2020.01)
  G06F 3/0482 (2013.01)
  G06K 9/00 (2006.01)
(52) U.S. Cl.
  CPC .......... G06F 40/174 (2020.01); G06F 3/0482 (2013.01); G06K 9/00449 (2013.01)
(58) Field of Classification Search
  CPC .............................. G06F 17/243; G06F 40/174
  USPC ....................................................... 715/226
  See application file for complete search history.

(56) References Cited

U.S. PATENT DOCUMENTS

| 7,065,707 B2 | 6/2006 | Chen et al. | |
| 2005/0198563 A1* | 9/2005 | Kristjansson | ......... G06F 40/174 715/224 |
| 2008/0120257 A1 | 5/2008 | Goyal | |
| 2009/0110288 A1 | 4/2009 | Fujiwara | |
| 2012/0166929 A1* | 6/2012 | Henderson | ............ G06F 17/243 715/224 |
| 2016/0019197 A1 | 1/2016 | Iasi | |
| 2016/0217119 A1 | 7/2016 | Dakin | |
| 2017/0046622 A1 | 2/2017 | Gaither | |
| 2017/0075873 A1* | 3/2017 | Shetty | .................... G06F 17/243 |
| 2019/0073348 A1* | 3/2019 | Cheesman | ......... G06K 9/00449 |

OTHER PUBLICATIONS

Rukzio, Enrico, Albrecht Schmidt, and Heinrich Hussmann. "Privacy-enhanced intelligent automatic form filling for context-aware services on mobile devices." In Workshop Artificial Intelligence in Mobile Systems. 2004. (Year: 2004).*

Marszałek et al., "Semantic Hierarchies for Visual Object Recognition", Proceedings / CVPR, IEEE Computer Society Conference on Computer Vision and Pattern Recognition, dated Jun. 2007, 7 pages.

Amazon Mechanical Turk, "Human Intelligence Through an API". https://www.mturk.com/, last viewed on Oct. 1, 2018, 7 pages.

Caffe, "Deep Learning Framework", BAIR, http://caffe.berkeleyvision.org, last viewed on Oct. 18, 2018, 4 pages.

Colah's Blog, "Understanding LSTM Networks", dated Aug. 27, 2015, 15 pages.

(Continued)

*Primary Examiner* — Frank D Mills
(74) *Attorney, Agent, or Firm* — Hickman Palermo Becker Bingham LLP

(57) ABSTRACT

A form management server computer ("server") and processing methods are disclosed. In some embodiments, the server is programmed to cause presentation of a result of identifying form elements from an image of a form and allow correction of the result or specification of actions to be performed on the form elements. The server is programmed to then receive a new image of a new form, identify form elements in the new form from the new image, and determine actions to be performed on the form elements in the new form based on the specification of actions for previously processed forms.

21 Claims, 8 Drawing Sheets

(56) References Cited

OTHER PUBLICATIONS

GitHub, "models/research/object_detection at master" • tensorflow/models, https://github.com/tensorflow/models/tree/master/research/object_detection, last viewed on Oct. 18, 2018, 6 pages.
GitHub, Tesseract-ocr/tesseract: Tesseract Open Source OCR Engine (main repository), https://github.com/tesseract-ocr/tesseract, last viewed on Oct. 1, 2018, 4 pages.
Glorot et al., "Understanding the difficulty of training deep feedforward neural networks." Proceedings of the thirteenth international conference—artificial intelligence and statistics, 2010, 8 pgs.
He, Kaiming, et al. "Delving deep into rectifiers: Surpassing human-level performance on imagenet classification." Proceedings of the IEEE international conference on computer vision. 2015, 11 pages.
Hinton, Geoffrey E., et al. "Improving neural networks by preventing co-adaptation of feature detectors." arXiv preprint arXiv:1207.0580 (2012), 18 pages.
Ioffe, Sergey, and Christian Szegedy. "Batch normalization: Accelerating deep network training by reducing internal covariate shift." arXiv preprint arXiv:1502.03167 (2015), 11 pages.
Keras: The Python Deep Learning library, "Keras", https://keras.io, last viewed on Oct. 18, 2018, 5 pages.
"Class Robot" (Java Platform SE 6, https://docs.oracle.com/javase/6/docs/api/java/awt/Robot.html, dated Jun. 3, 2019, 7 pages.
Mandal et al., "A hierarchical Method for Automated Identification and Segmentation of Forms", In Eighth International Conference on Document Analysis and Recognition (ICDAR '05), pp. 705-709.
Wikipedia, "Activation Function", https://en.wikipedia.org/wiki/Activation_function, lasted viewed on Oct. 1, 2018, 5 pages.
Mikolov, Tomas, et al. "Distributed representations of words and phrases and their compositionality." Advances in neural information processing systems. 2013, 9 pages.
MXNet, "Apache MXNet (Incubating) A flexible and efficient library for deep learning", MXNet 1.3.0 Released, https://mxnet.apache.org, last viewed on Oct. 18, 2018, 3 pages.
OpenCV 2.4.13.7 Documentation, "Template Matching", https://www.docs.opencv.org/2.4/doc/tutorials/imgproc/histograms/template_matching/template_matching.html, dated Jun. 3, 2019, 9 pages.
Pennington et al. "Glove: Global vectors for word representation", Proceedings of the 2014 conference on empirical methods in natural language processing (EMNLP). 2014, 12 pages.
PyAutoGUI's, "Welcome to PyAutoGUI's Documentation!", 5.https://pyautogui.readthedocs.io/en/latest/, last viewed on Jun. 4, 2019, 2 pages.
PyTorch, "From Research to Production", https://pytorch.org, last viewed on Oct. 18, 2018, 3 pages.
Rumelhart et al., "Learning representations by back-propagating errors." nature 323.6088 (1986), 4 pages.
Santoro et al., "A Simple Neural Network Module for Relational Reasoning", dated Jun. 5, 2017, 16 pages.
Selenium, "What is Selenium?", https://docs.seleniumhq.org, last viewed on Jun. 3, 2019, 3 pages.
Sikuli, "Sikuli Documentation for version 1.1", https://sikulix-2014.readthedocs.io/en/latest/index.html , last viewed on Jun. 3, 2019, 3 pages.
TensorFlow, "TensorFlow 1.11", Get started with TensorFlow, https://www.tensorflow.org, last viewed on Oct. 18, 2018, 7 pages.
Kingma et al. "Adam: A method for stochastic optimization." arXiv preprint arXiv:1412.6980 (2014), 15 pages.
Geng, U.S. Appl. No. 16/163,473, filed Oct. 17, 2018, Office Action, dated Feb. 8, 2019.
Geng, U.S. Appl. No. 16/163,473, filed Oct. 17, 2018, Notice of Allowance, dated May 21, 2019.
Geng, U.S. Appl. No. 16/163,473, filed Oct. 17, 2018, Interview Summary, dated Apr. 25, 2019.

* cited by examiner

Billing address — 322

First Name
Last Name
Company
Address
Address2
City — 324
Postal/ZIP Code
Country: Israel
Phone
State / Province ☐ Ship items to the above billing address Continue to next step Shipping address — 326

First Name
Last Name
Company
Address
Address2 — 328
City
Postal/ZIP Code
Country: United States
Phone
State: -- Please Select --

FIG. 4C

442 Receive a first electronic image of a first form

444 Apply a digital model to the first electronic image, producing an identification of a first list of areas within the first electronic image as corresponding to a first list of form elements, including a first list of fields, and a context for each of the first list of fields in the first form, the context being related to a field label and a group label in the first list of form elements 446 Match each of the first list of areas with an area of a second list of areas within a second electronic image of a second form, the second list of areas corresponding to a second list of form elements, including a second list of fields, and a context for each of the second list of areas corresponding to a second list of fields in the second form 448 Determine, for each of the first list of areas, an action associated with the field corresponding to the matched area of the second list of areas 450 Cause, for each of the first list of areas, performance or an indication of performance of the determined action on the corresponding field of the first list of fields

ENHANCING ELECTRONIC FORM DATA BASED ON HIERARCHICAL CONTEXT INFORMATION

FIELD OF THE DISCLOSURE

One technical field of the present disclosure is digital data processing and transmission and graphical user interface. Another technical field is automatically filling out forms given electronic images of the forms based on intelligent identification and mapping of form areas.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A form includes form elements, such as fields to be filled out, or labels that clarify the purposes or meanings of other form elements. A form is generally a useful tool for soliciting information and building a document. A digital form can include various types of graphical input elements that implement fields, such as a radio button, a check box, a drop-down list, a file-upload button, or a calendar tool. Interaction with some of these graphical input elements might require multiple steps. Forms used for a specific purpose, such as invoicing, typically include similar but not necessarily identical form elements and layouts. Given how common forms are used, it could be time-consuming to complete many similar forms. It would be helpful to have a system that can automatically recognize form elements in a form, determine actions to be performed on the form elements, and automatically complete the form.

BRIEF DESCRIPTION OF THE DRAWINGS

In the drawings:

FIG. 3A illustrates an example graphical user interface configured to show a template form that is being configured.

FIG. 3B illustrates an example graphical user interface configured to show a certain form being processed against template forms.

FIG. 4C illustrates yet another example process of automatically filling out forms.

DETAILED DESCRIPTION

Figure 1:
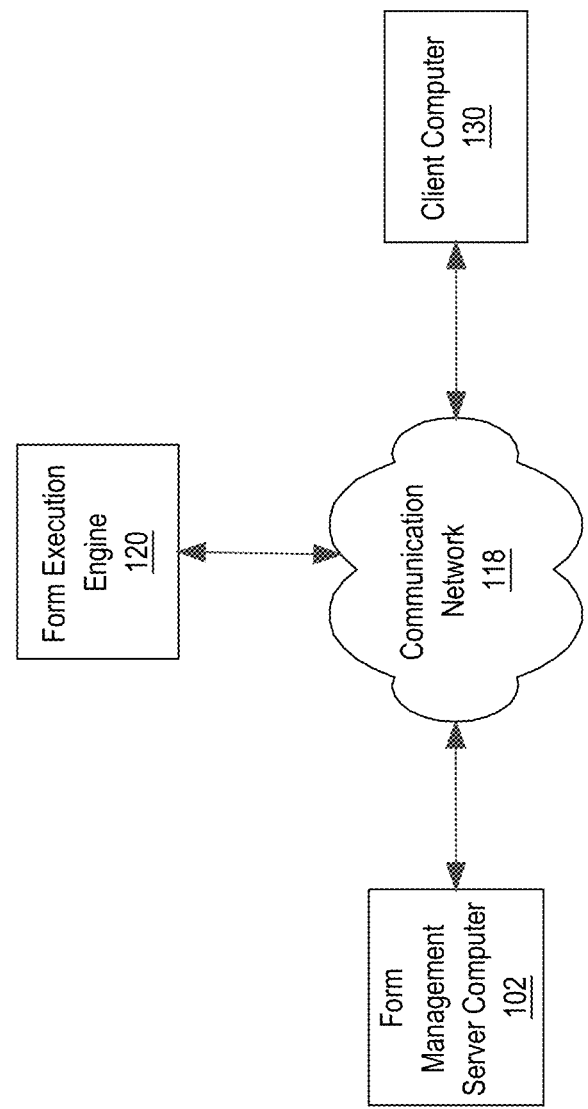
FIG. 1 illustrates an example networked computer system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:

1. GENERAL OVERVIEW
2. EXAMPLE COMPUTING ENVIRONMENTS
3. EXAMPLE COMPUTER COMPONENTS
4. FUNCTIONAL DESCRIPTIONS
   4.1. BUILDING AN AUTOMATIC PROCESSING PIPELINE
      4.1.1. IDENTIFYING FORM ELEMENTS AND CONTEXT INFORMATION
      4.1.2. VERIFYING IDENTIFICATION OF FORM ELEMENTS AND CONTEXT INFORMATION
      4.1.3. DETERMINING ACTIONS FOR FORM FIELDS
   4.2. UTILIZING AN AUTOMATIC PROCESSING PIPELINE
5. EXAMPLE PROCESSES
6. HARDWARE IMPLEMENTATION
7. EXTENSIONS AND ALTERNATIVES

1. General Overview

A form management server computer ("server") and processing methods are disclosed. In some embodiments, the server is programmed to cause presentation of a result of identifying form elements from an image of a form and allow correction of the result or specification of actions to be performed on the form elements. The server is programmed to then receive a new image of a new form, identify form elements in the new form from the new image, and determine actions to be performed on the form elements in the new form based on the specification of actions for previously processed forms.

In some embodiments, the server is programmed to receive an electronic image ("image") of a form. The form can be a digital form generated by a computer application, which may run at a website. The form can have a hierarchical structure that includes fields to be filled out and labels clarifying the purposes or meanings of other form elements. For example, when the form is an invoice, the form may include a first group of fields and labels for a shipping address and a second group of fields and labels for a billing address. A label can be for a group of form elements ("group label") or for a field ("field label"). Labels typically comprise text or images. The fields can be represented by graphical input elements, such as a text field, a check boxes, a drop-down list, a file upload button followed by a folder browsing window, or a calendar icon followed by a date selector. The server is programmed to also receive additional information regarding the form, such as source code used to render the form.

In some embodiments, the server is programmed to identify form elements in the form and hierarchical context information for the form elements from the image. The server is programmed to further cause presentation of a graphical user interface (GUI) that enables correction of the identification result or specification of actions to be performed on the form elements. The GUI facilitates recognition of contextual information. For example, when the focus is in the field for providing the state of the shipping address, the field label "State" and the group label "Shipping Address" can be highlighted. Each action can be specified with actual performance or a description of the action. For example, the action for the above-mentioned field can be specified by choosing an entry from a drop-down list of state names that corresponds to a lookup from a database based on the value for the field for providing the zip code of the shipping address in the same form or a look up from an address book associated with a certain user. By undergoing the processing described, the image and the form can be considered as a template image and a corresponding template form, for which the server is programmed to further save form data related to the form elements and corresponding contextual elements and action data related to the actions to be performed on the form elements.

In some embodiments, the server is programmed to receive a new image of a new form. The server is programmed to identify form elements in the new form and hierarchical context information for the form elements from the new image. The server is programmed to then match the new image or the new form with a template image and the corresponding template form using the associated form data. The matching can include comparing portions of the images, types, locations, or shapes of the form elements, text segments within portions of the images, or source code segments used to render the images. The server is programmed to further determine the actions to be performed on the form elements in the new form using the action data associated with the template image and the template form.

The server offers several technical benefits and improvements over past approaches. By intelligently identifying form elements and performing actions on the form elements to automatically fill out a form, the server reduces the overall time of processing the form. By facilitating the recognition of contextual information in a form by a user in an iterative approach of using user input to refine automatic identification, the server further improves the processing efficiency and data accuracy. By being able to recognize and match various types of graphical input elements that represent fields in a digital form from images and indicate interactions with these graphical input elements, the server increases the scope and complexity of data that can be handled in form processing.

2. Example Computing Environments

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, the networked computer system comprises form management server computer 102 ("server"), a form execution engine 120, and a client computer 130, which are communicatively coupled directly or indirectly via one or more communication networks 118. In certain embodiments, the form execution engine 120 is integrated with the server 102 or the client computer 130.

In some embodiments, the server 102 broadly represents one or more computers, virtual computing instances, and/or instances of a server-based application that is programmed or configured with data structures and/or database records that are arranged to host or execute functions including but not limited to gathering and incorporating user input on identification of form elements and performance of actions on form elements and automatically filling out future forms. The server 102 can comprise a server farm, a cloud computing platform, a parallel computer, or any other computing facility with sufficient computing power in data processing, data storage, and network communication for the above-described functions.

In some embodiments, the form execution engine 120 is programmed to perform determined actions on form elements, which can be fields in a digital form represented by graphical input elements. The form execution device 120 may comprise any type of computing device with sufficient computing power in data processing, data storage, and network communication or with appropriate data input capabilities for the above-described functions.

In some embodiments, the client computer 130 is programmed to monitor, verify, or correct the processing of forms, including the identification of form elements or the performance of actions on form elements. The client computer 130 may comprise any type of computing device with sufficient computing power in data processing, data storage, and network communication or appropriate data input or output capabilities for the above-described functions.

The networks 118 may be implemented by any medium or mechanism that provides for the exchange of data between the various elements of FIG. 1. Examples of networks 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the server 102 is programmed to receive an image of a form, such as a representative form of a certain type, from the client computer 130 or another source. The server 102 is programmed to identify form elements from the image. The server 102 is programmed to further generate an enhanced image based on the image and the identification result and transmit the enhanced image to the client computer 130. The server 102 can also be configured to receive, from the client computer 130, corrections of the identification result or specifications of actions to be performed on identified form elements. The server 102 is programmed to then store the specifications for processing future forms.

In some embodiments, subsequently, the server 102 is programmed to receive a new image of a new form of the same type from the client computer 130 or another source. The server 102 is programmed to similarly identify form elements from the new image. The server 102 is programmed to then match the new image or new form with a template image of a template form that was previously processed. The server 102 is programmed to also determine actions to be performed on the new form based on the specifications of actions to be performed on the template form.

In some embodiments, the server 102 is programmed to then send data related to the form elements in the new form, including the specifications of actions to be performed on those form elements, to the form execution engine 120. The form execution engine 120 is programmed to perform or cause indication of performance of the determined actions on the form elements in the new form. The form execution engine 120 or the server 102 is programmed to then generate an enhanced image indicating performance of the determined actions on the new form and transmit the enhanced image to the client computer 130. The server 102 can also be configured to receive, from the client computer 130, corrections of the determined actions performed on the form elements in the new form.

3. Example Computer Components

Figure 2:
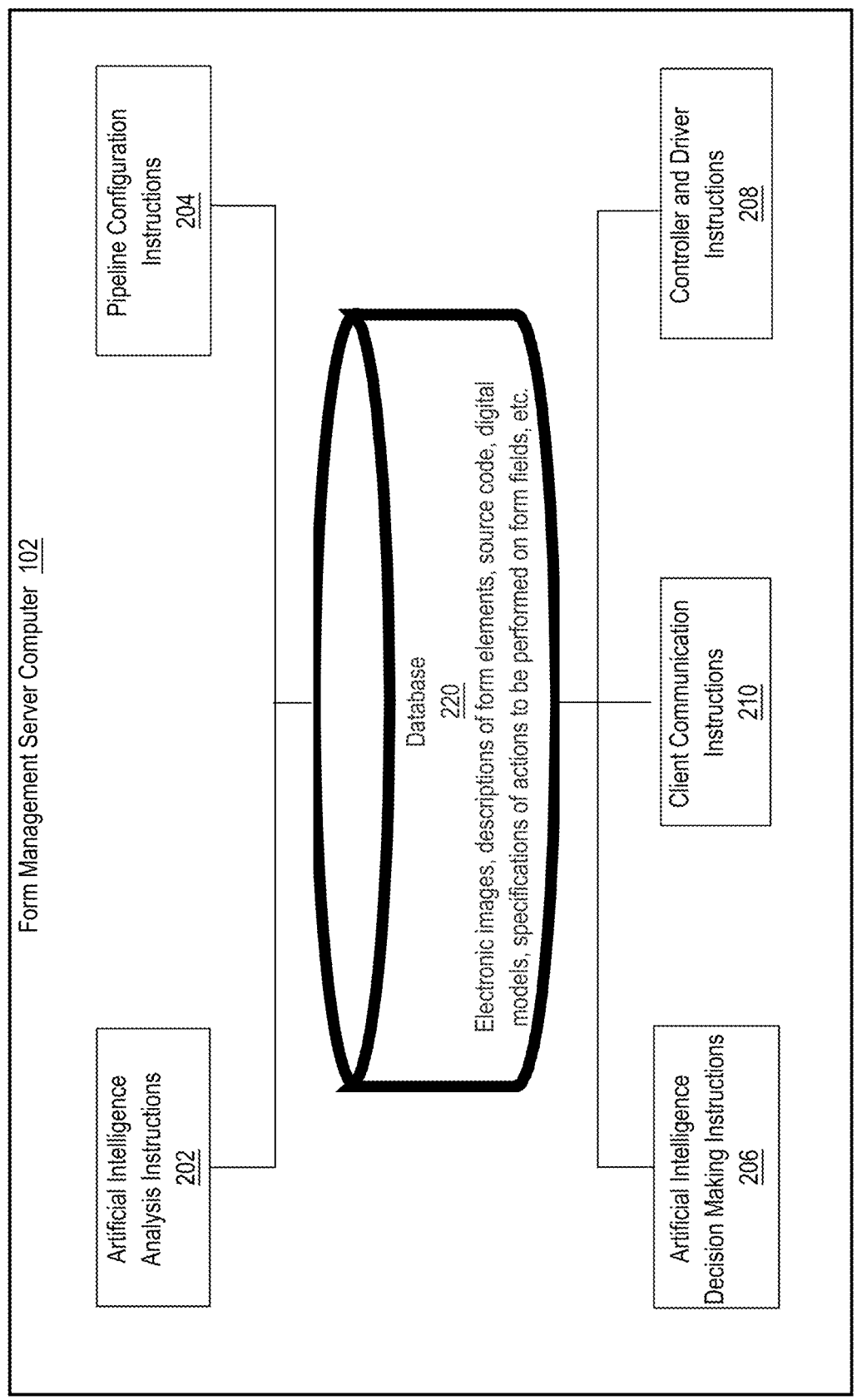
FIG. 2 illustrates example computer components of a form management server computer in accordance with the disclosed embodiments.

FIG. 2 illustrates example components of the form management server computer in accordance with the disclosed embodiments. This figure is for illustration purposes only and the server 102 can comprise fewer or more functional or storage components. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the server 102 can comprise artificial intelligence analysis instructions 202, pipeline configuration instructions 204, artificial intelligence decision making instructions 206, controller and driver instructions 208, and client communication instructions 210. In addition, the server 102 can comprise a database 220.

In some embodiments, the artificial intelligence analysis instructions 202 enable identification of form elements and context information regarding the form elements from an electronic image of a form having a hierarchical structure. The form elements can include fields represented by graphical input elements. The identification can include building or receiving a digital model configured to identify form elements or the corresponding contextual elements.

In some embodiments, the digital pipeline configuration instructions 204 enable configuration or specification of actions to be performed on form elements and fields in particular. The configuration can indicate the type of input device to be used or the source of input data to be entered. The configuration can also indicate a sequence in which actions are to be performed.

In some embodiments, the artificial intelligence decision making instructions 206 enable determination of which actions to perform on form elements in a form from an image of the form, in order to fill out the form. The determination can include matching the image or the form with a template image or a corresponding template form processed previously and identifying the actions specified for form elements in that template form.

In some embodiments, the controller and driver instructions 208 enable performance of or indication of performance of actions on form elements in a form. The performance can include applying appropriate input devices or locating input data from appropriate sources.

In some embodiments, the client communication instructions 210 enable communication with client devices. The communication can include receiving an image of a form to be used as a template, transmitting the image with a result of identifying form elements and context information from the image, receiving a correction of the identification result or a specification of actions on the form elements, receiving a new image of a new form, transmitting the new image with a result of performing appropriate actions on the new form, or receiving a correction of actions.

In some embodiments, the database 220 is programmed or configured to manage relevant data structures and store relevant data for functions performed by the server 102. The relevant data may include electronic images, descriptions of form elements, source code used to generate digital forms, digital models for identifying form elements and context information, specifications of actions to be performed on form fields, and so on.

4. Functional Descriptions 4.1. Building an Automatic Processing Pipeline 4.1.1. Identifying Form Elements and Context Information In some embodiments, the server 102 is programmed to receive a video that includes multiple electronic images ("images") of forms or form screens from a client computer of a user or another source. Each image can be displayed by the client computer before being transmitted to the server 102 or transmitted to the server 102 directly. The server 102 is programmed to analyze the image to identify form elements in the corresponding form and transmit the image and the analysis result to the client computer for specification of how to fill out the form. The specification of how to fill out this form can be applied to additional images of additional forms that are identical or similar to this form.

A form or specifically a hierarchical form generally has various form elements, including one or more fields, labels for the fields ("field labels"), and labels for a group of fields and associated field labels ("group labels"). A field label or a group label typically comprises text or images. A field is to be filled in with data and can be represented in different formats. For example, a field may be configured to receive text, a specification of a path for an upload, or a selection from a group. In a digital form, a field is often represented as a text box, a radio button with a button label, a check box with a box label, a drop-down list with an option to activate the drop-down list followed by a drop-down menu, a upload button followed by a folder window listing documents in the folder, a calendar icon followed by a calendar window showing dates of a month, or another input element that can receive one or more pieces of data. A form may thus comprise multiple screens that correspond to multiple steps to be taken and can be captured in consecutive images.

In some embodiments, for a specific image of the multiple images, the server 102 is programmed to receive additional information associated with the specific image that may be available from the source of the specific image. Specifically, when the source is a website and the image corresponds to a webpage, the server 102 can be programmed to retrieve the source code of the webpage.

In some embodiments, the server 102 is programmed to build or obtain a digital model for recognizing form elements in a form and relationships among the form elements. A digital model in this context refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. The digital model can be built using the technique disclosed in the co-pending U.S. patent application Ser. No. 16/163,473 filed on Oct. 17, 2018 or other techniques known to someone skilled in the art. The technique disclosed in the co-pending application includes receiving a training set of images of forms. Specifically, each image generally comprises a plurality of portions each classified as a field, a field label, or a group label. The technique further includes building a feature vector for each portion and then building a digital model that comprises a series of sub-models from the feature vectors. The series of sub-models include some sub-models to encode, for each portion classified as a field, a pairing with each portion classified as a field label and a pairing with each portion classified as a group label in the same image and some sub-models to determine whether an encoding represents a correct pairing that links a field with the corresponding field label and group label. The digital model is configured to accept an image of a form and identifies, for each portion classified as a field, a first portion that corresponds to the field label for the field and a second portion that corresponds to the group label for the field. The field label and the group label are considered as contextual elements for the field providing a hierarchical context for the field.

In some embodiments, in order to apply the digital model to recognize form elements of the form in the specific image, the server 102 is programmed to identify portions of the specific image of the form that correspond to a field, a field label, or a group label using various object recognition techniques known to someone skilled in the art. As noted above, a field label or a group label typically comprises text or images and is easily recognizable. A field can be represented in different formats and is also easily distinguished from a field label or a group label. The server 102 is programmed to determine not only the presence of a field but the type of the field to facilitate the specification of a corresponding action of filling in the field, as further discussed below. The determination of the presence or type of a field may be based on appearance. For example, each of a text box, a radio button with the button label, a check box with a box label, a drop-down list activation option, a drop-down menu, an upload button, a folder window, a calendar icon, and a calendar window has a distinct look that can be easily recognized using image recognition methods. The determination may also be based on programming data. For example, each type of field representation is generally considered as a type of form control in a webpage and the type information is encoded as an attribute of an input element in the corresponding HTML file. Therefore, when the source code for a webpage is available, each form control can be easily recognized using HTML parsing methods.

In some embodiments, the server 102 is programmed to obtain and store, for each portion of the specific image that corresponds to a form element, form data comprising one or more of the following items, which may correspond to features of a form element:
- A. An ID, which is a unique string value.
- B. A web indicator, which is a binary value indicating whether the specific image comes from a website.
- C. A value of the "id" attribute of the corresponding object in the HTML code corresponding to the specific image that comes from a website.
- D. A class, which is an ordered value indicating the type of a field.
- E. A confidence score, which is a numerical value indicating the confidence in the classification of the portion (in terms of the type of a form element or the type of a field) and which is exceeding a threshold or the portion would not have been recognized as a form element.
- F. A location, which is represented by a bounding box over the portion, [x, y, w, h], where (x, y) are the coordinates of the left top point of the bounding box and w, h are the width and height of the bounding box.
- G. A text segment, which is a string for the text that appears within the portion and may correspond to a field label, a group label, a button label, a box label, or text within image data.
- H. A cropped image, which is represented as a three-dimensional matrix corresponding to the two location coordinates plus the pixel value.

4.1.2. Verifying Identification of Form Elements and Context Information

In some embodiments, the server 102 is programmed to apply the digital model to the specific image based on the identified portions and the respective feature values, as discussed above. The application of the digital model produces contextual information for each field in the corresponding form. The server 102 is programmed to then send the specific image and the output of the digital model to the client computer.

In some embodiments, the server 102 is programmed to cause presentation of a graphical user interface (GUI) that shows the form identified from the specific image and allow a user to correct the identification result. The GUI can include the form and the rest of the specific image that has not been recognized as corresponding to form elements. Instead of including actual form elements, the GUI can include an enhanced image with the specific image and an overlay of indicators of the form elements. The indicator can comprise a bounding box and a label indicating the type of a form element or the type of a field.

Figure 3A:
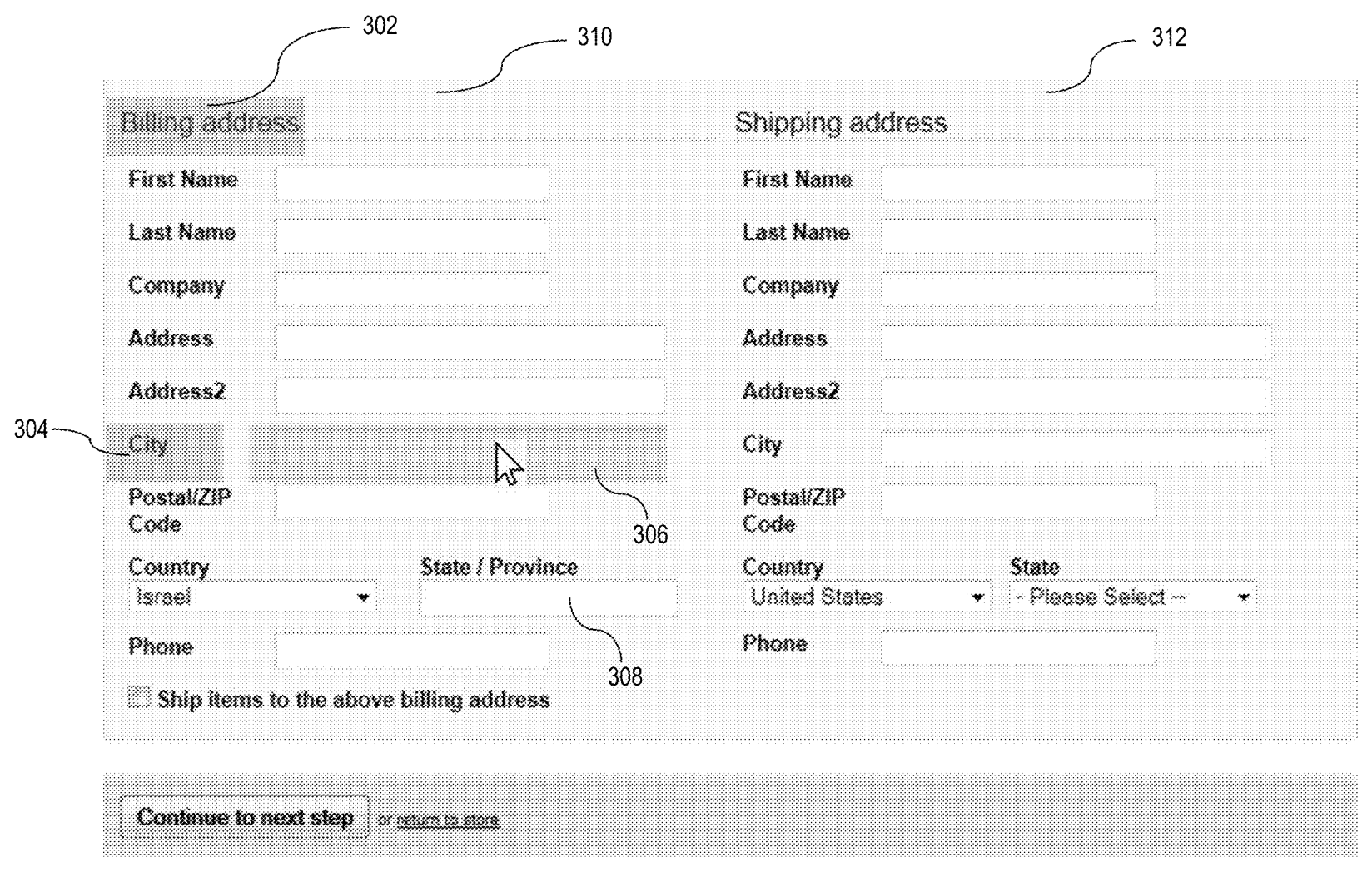

FIG. 3A illustrates an example graphical user interface that shows a form identified from a specific image. This form includes two groups of form elements, a first group 310 for form elements related to a billing address, and a second group 312 for form elements related to a shipping address.

In some embodiments, the GUI can be configured to allow adding a form element, by first specifying a portion of the specific image and specifying the type of the form element or specifically the type of a field. For example, the GUI can be configured to allow drawing a bounding box over a portion of the specific image to indicate that the portion corresponds to a form element that was not identified. Similarly, the GUI can be configured to allow deleting the bounding box to indicate that the portion was incorrectly identified as corresponding to a form element. The GUI can further allow choosing from a drop-down list of a field label, a field, or a group label to indicate the type of the unidentified form element. Similarly, the GUI can be configured to allow removal of a form element or update of an existing form element, such as adjusting the size or the type of a field or correcting the text of a label, through various graphical elements or controls in the GUI. For example, a user can be allowed to adjust the width of the field 308 or change the type of the field 308 from a text field to a drop-down list.

In some embodiments, the GUI is configured to allow update of context information identified for the form elements. The contextual elements for a field can be highlighted in response to any interaction with the field. For example, when a mouse-over is detected over the field 306, the field label 304 and the group label 302 can be shown in a different font, color, or with a different background to inform a user of the identified context information for the field 306. The GUI can be configured to allow removing, adjusting, or adding a contextual element. For example, when the mouse is over or in the field 306, a user can be allowed to click on the field label 304 to remove the field label 304 as a contextual element for the field 306, or to click on the field label 304 again or another field label in the form to add the field label as a context element for the field 306. A user can also be allowed to draw a line between the field 306 and a field label in the form to indicate that the field label is a contextual element for the field 306.

In some embodiments, the server 102 is programmed to establish a feedback ingestion loop to incorporate any correction of the output of the digital model discussed above into the re-training of the digital model. The correction provides a true identification of a form element from an image and thus can be incorporated into one or more stages of training the digital model for recognizing form elements in a form.

4.1.3. Determining Actions for Form Fields

In some embodiments, the server 102 is programmed to cause presentation of a GUI that shows the form identified from the specific image and allow a user to specify how to fill out the form. The GUI can include the form and the rest of the specific image that has not been recognized as corresponding to form elements. Instead of including actual form elements, the GUI can include an enhanced image with the specific image and an overlay of indicators of the form elements. In response to an interaction with a field in the GUI, the GUI is configured to cause recording of the action performed on the field. In response to an interaction with an indicator of a field, the GUI is programmed to present a list options corresponding to possible actions to be performed on the field. The list can include the same options for every field or only options specific to the type of the field. The options can include a (left/right) click, a double click, typing in constant text, or typing in specific text that corresponds to a particular portion of a particular image or a field in a database table, for example. The GUI is also configured to cause recording of the chosen option. In response to an interaction with a field or an indicator thereof, the GUI can also be configured to highlight the contextual elements for the field to facilitate the interpretation of and action on the field.

In some embodiments, the GUI is configured to cause storing of relevant data regarding the performed or selected actions and transmission of the relevant data to the server 102. The specific image and the corresponding form are then considered as a template that can be used to determine the actions to be performed on a new form captured in a new image, as further discussed below. For each performed or selected action, the relevant data can include: 1. An index of the action corresponding to an order of performance across all fields in the form, as sometimes the data entered in one field determines the data entered in another field; 2. An identifier of the target form element indicating the form element on which the action is to be performed; 3. An identifier of the action indicating the kind of action to perform; 4. Additional information regarding the action, such as the constant text to fill in the text field, the location of the text to be extracted from a certain image, or the identifier of a table field storing the text to be looked up from a database; 5. Information of the target form element, including data related to the corresponding portion of the specific image, type, location, extracted texts, and contextual elements.

In some embodiments, the server 102 is programmed to learn from the relevant data regarding the performed or selected actions for automatically determining the actions to be performed on particular fields. For example, it may be detected that there is a positional correlation between the fields in the form and the text segments in a related image that are used to fill in the fields, or that for particular fields, the context information can be used to obtain data to fill in the particular fields from a database, the date filled into a first field is always some time later than the second field, and so on. The learning result can be used to determine how to fill out additional forms under certain circumstances.

4.2. Utilizing an Automatic Processing Pipeline

In some embodiments, the server 102 is programmed to receive a video that includes multiple images of forms or form screens from a client computer of a user. Each image can be displayed by the client computer before being transmitted to the server 102 or transmitted to the server 102 directly. For each image of a form, the server 102 is programmed to identify form elements and associated context information and apply appropriate actions to identified fields, as discussed in Section 4.1. The server 102 is programmed to then transmit the filled-out form or an enhanced image corresponding to the filled-out form or form screen to the client computer. The enhanced image can similarly include the image and an overlay of indicators of form elements and contents filling the fields. The client computer can be configured to cause a display of each enhanced image, thereby showing how the form is filled out for user monitoring or verification.

In some embodiments, for a specific image of the multiple images, the server 102 is programmed to identify form elements from the specific image and determine appropriate actions to be performed on the identified fields. Specifically, the server 102 is programmed to match the specific image to one of the processed template images for which associated form data was stored, as discussed in Section 4.1. The server 102 is programmed to cause performance or indication of performance of the actions identified in the associated action data in the correct order on the underlying form as further discussed in Section 4.1.

In some embodiments, to match the specific image, the server 102 is programmed to perform the following steps for each portion of the specific image deemed to correspond to a form element. The first step is to match a specific portion of the image corresponding to a specific form element against each template images using any image matching technique known to someone skilled in the art, such as the template matching algorithm available from OpenCV for searching and finding the location of an image patch in a larger input image. When the specific portion can be uniquely matched with a certain portion of a certain template image corresponding to a certain form element, the server 102 can be programmed to conclude a match for the specific portion of the specific image from a success of the first step. Alternatively, only when the portions of the specific image corresponding to the contextual elements for the specific form element can also be uniquely matched with portions of the template image corresponding to the contextual elements for the certain form element, would the server 102 be programmed to conclude a match for the specific portion of the specific image.

In some embodiments, when the first step fails, the second step is performed. Such a failure could be due to incorrect determination of the context information in the specific image or a template image. The second step is to match the specific portion of the specific image against each template image based on geometric relationships.

FIG. 3B illustrates an example graphical user interface configured to show a certain form being processed against template forms.

The processing of a template image may have for some reason failed to identify context information for a field in the underlying form. For example, the processing of the template form illustrated in FIG. 3B might have failed to identify the group label 322 as the group label for the field 324 and similarly failed to identify the group label 326 as the group label for the field 328. Therefore, the first step discussed above may have failed for the specific portion of the specific image because the specific portion is similar to the field 324 and can be matched with both portions of the template image for the field 324 and the field 328 without considering context information, or the specific portion can be matched with nothing at all when context information is considered. In this case, the server 102 can be programmed to correct the context information for the field 324 and the field 328 by determining that as the field 324 is vertically aligned with the group label 322, the group label 322 can be the group label for the field 324, and similarly as the field 324 is not vertically aligned with the group label 326, the group label 326 would not be the group label for the field 324. As a result of the correction, the specific portion of the specific image can be uniquely matched with the field 324 in the template image. The server 102 can be programmed to then conclude a match for the specific portion of the specific image from a success of the second step.

In some embodiments, when the second step also fails, the third step is performed. The third step is to, instead of considering the specific portion of the specific image as an image, consider the combination of the type of the specific form element and the text extracted from the specific portion. When the combination for the specific portion can be uniquely matched with a corresponding combination for a certain portion of a certain template image corresponding to a certain form element, the server 102 can be programmed to conclude a match for the specific portion of the specific image from a success of the third step. Alternatively, only when corresponding combinations for portions of the specific image corresponding to the contextual elements for the specific form element can also be uniquely matched with corresponding combinations for portions of the certain image corresponding to the contextual elements for the certain element, would the server 102 be programmed to conclude a match for the specific portion of the specific image.

In some embodiments, the server 102 is programmed to first determine whether the specific image originates from a website. If the specific image originates from a website, the server 102 is programmed to utilize the source code for the corresponding webpage in the match in addition to or instead of the steps discussed above. In another embodiment, the order of the steps discussed above can be adjusted. For example, the third step could be performed before the second step, and only when the third step fails would the second step be performed. For further example, some of the steps can be performed in parallel.

In some embodiments, when no match can be concluded for the specific portion of the specific image, the server 102 is programmed to transmit information indicating an error or an exception to the client computer. When a match can be concluded for each portion of the specific image, the server 102 is programmed to evaluate the action data associated with the corresponding form elements or fields specifically and cause performance or indication of performance of the actions identified in the action data. When the underlying form originates from a website, for example, the server 102 can be configured to cause filling out the underlying form online using an appropriate technique known to someone skilled in the art, such as PyAutoGUI or jvay.awt.Robot.

In some embodiments, as the enhanced image indicating performance of the actions is transmitted to the client computer, the server is programmed to receive feedback from the client computer. The feedback can indicate that an incorrect action is performed on a form element or that certain actions are performed in an incorrect order. The server 102 can be programmed to stop the transmission of the enhanced images, allow specification of specific feedback, or record the specific feedback to improve learning of the action data.

5. Example Processes

Figure 4A:
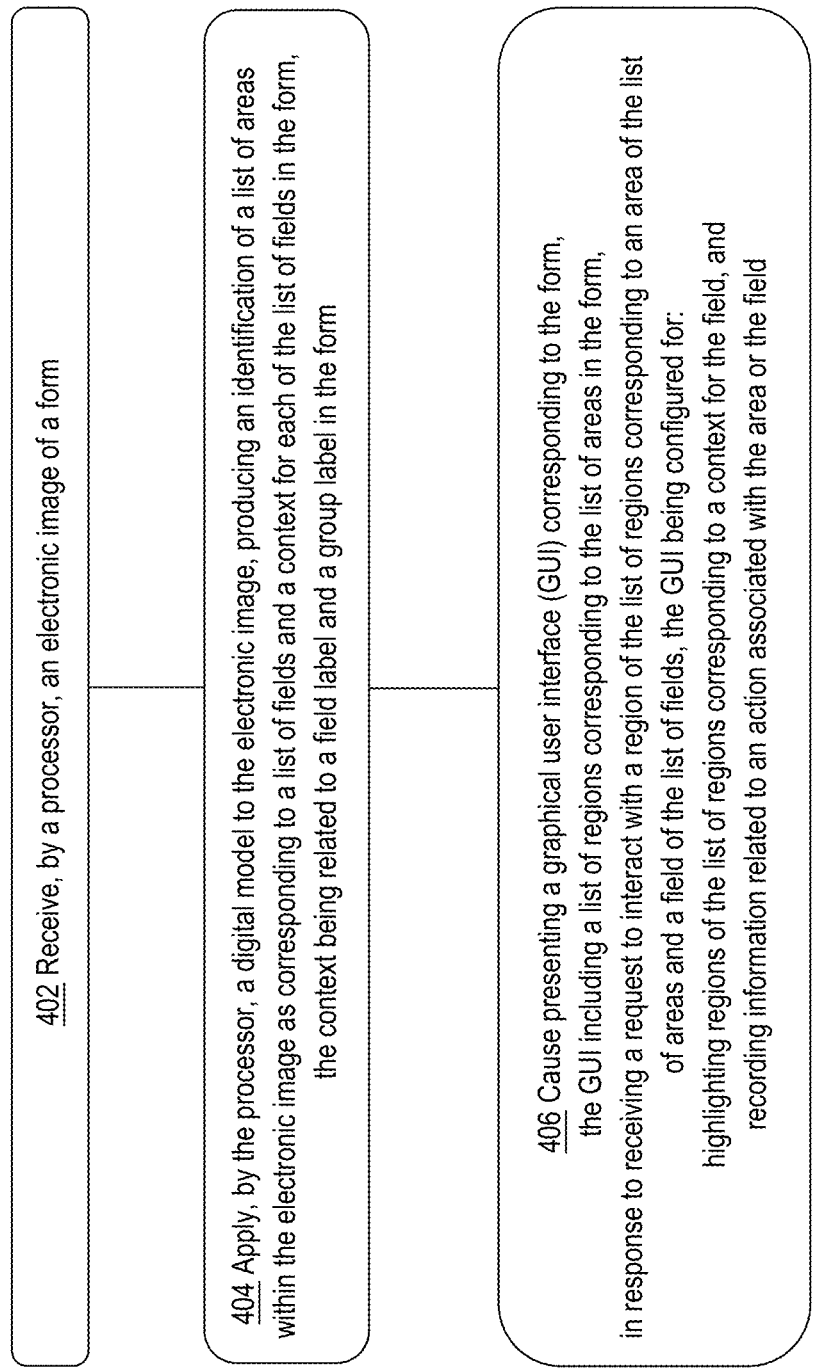
FIG. 4A illustrates an example process of automatically filling out forms.
Figure 4B:
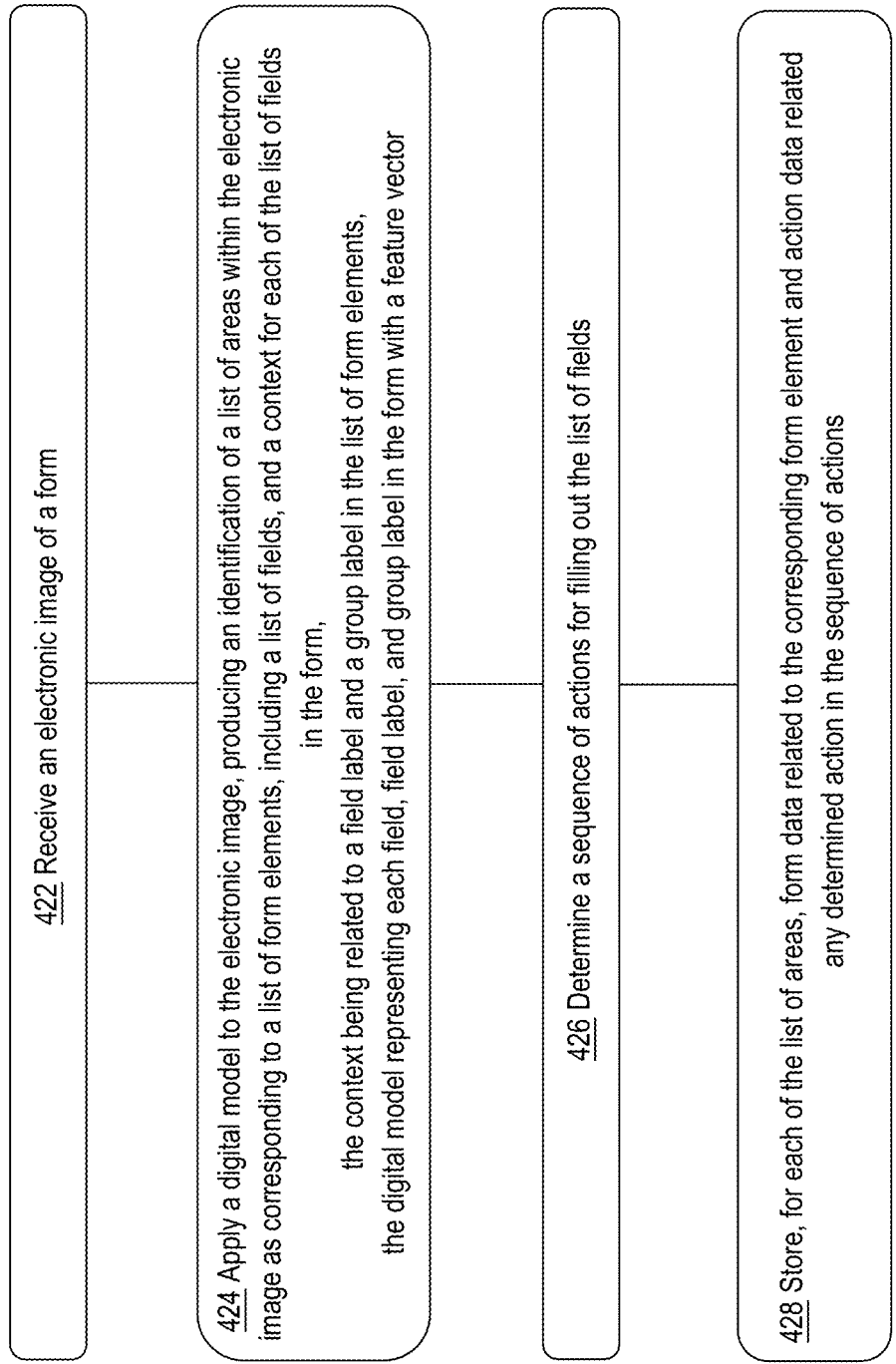
FIG. 4B illustrates another example process of automatically filling out forms.

FIG. 4A, FIG. 4B, and FIG. 4C each illustrates an example process performed by the form management server computer. FIG. 4A, FIG. 4B, and FIG. 4C are each shown in simplified, schematic format for purposes of illustrating a clear example and other embodiments may include more, fewer, or different elements connected in various manners. FIG. 4A, FIG. 4B, and FIG. 4C are each intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

FIG. 4A illustrates an example process of automatically filling out a form. In some embodiments, in step 402, the server 102 is programmed or configured to receive an electronic image of a form.

In some embodiments, in step 404, the server 102 is programmed or configured to apply a digital model to the electronic image, producing an identification of a list of areas within the electronic image as corresponding to a list of fields and a context for each of the list of fields in the form. The context is related to a field label and a group label in the form. The digital model represents each field, field label, and group label in the form with a feature vector. In certain embodiments, the list of fields includes a field that corresponds to a radio button, a check box, a drop-down list, a file upload option, or a calendar tool.

In some embodiments, in step 406, the server 102 is programmed or configured to cause presenting a graphical user interface (GUI) corresponding to the form. The GUI includes a list of regions corresponding to the list of areas in the form. In response to receiving a request to interact with a region of the list of regions corresponding to an area of the list of areas and a field of the list of fields, the GUI is configured for highlighting regions of the list of regions corresponding to a context for the field, and recording information related to an action associated with the area or the field. In certain embodiments, the information includes an index of the action with respect to other actions associated with other fields of the list of fields.

In certain embodiments, the server 102 is also programmed to determine a type for each of the list of fields, and the action is providing a correction of an identification of the area as corresponding to the field that has a certain type. The correction can indicate that the area does not correspond to the field or that the field has a different shape, type, or context.

In some embodiments, the action can be filling in the field or providing a specification of how to fill in the field. The specification can indicate a mouse input, a keyboard input, a lookup from a database table, a computation from a value of another field, or an extraction from a specific image. In certain embodiments, in response to receiving the request to interact with the area, the GUI is further configured to display a list of input possible actions for filling in the field.

In some embodiments, the server 102 is programmed or configured to receive a second electronic image of a second form from a client computer. The server 102 is programmed to further apply the digital model to the second electronic image, producing an identification of a second list of areas within the second electronic image as corresponding to a second list of fields and a type and a context for each of the second list of fields in the second form. The server 102 is programmed to next match each of the second list of areas with an area of the list of areas. In addition, the server 102 is programmed to determine, for each of the second list of areas, an action associated with the field corresponding to the matched area of the list of areas. Finally, the server 102 is programmed to cause, for each of the second list of areas, performance or an indication of performance of the determined action on the corresponding field of the second list of fields. In certain embodiments, the causing can comprise generating an enhanced image for the second electronic image that indicates performance of the determined actions on the second list of fields. The server 102 can be programmed to further transmit the enhanced image to the client computer.

FIG. 4B illustrates another example process of automatically filling out the form. In some embodiments, in step 422, the server 102 is programmed or configured to receive an electronic image of a form.

In some embodiments, in step 424, the server 102 is programmed or configured to apply a digital model to the electronic image, producing an identification of a list of areas within the electronic image as corresponding to a list of form elements, including a list of fields, and a context for each of the list of fields in the form. The context is related to a field label and a group label in the list of form elements. The digital model represents each field, field label, and group label in the form with a feature vector.

In some embodiments, in step 426, the server 102 is programmed or configured to determine a sequence of actions for filling out the list of fields.

In some embodiments, in step 428, the server 102 is programmed or configured to store, for each of the list of areas, form data related to the corresponding form element and action data related any determined action in the sequence of actions. In certain embodiments, the server 102 is programmed to further determine a type for each of the list of fields based on the corresponding area as an image or a portion of source code used to render the electronic image. The form data can include a type of the form element, a type of a field, a portion of the corresponding area, text extracted from the corresponding area, a location of the corresponding area, or a shape of the corresponding area. The action data can include an index of the determined action or a source of input data to be entered into the field.

In some embodiments, the server 102 is programmed to receive a second electronic image of a second form from a client computer. The server 102 is programmed to further apply the digital model to the second electronic image, producing an identification of a second list of areas within the second electronic image as corresponding to a second list of fields and a type and a context for each of the second list of fields in the second form. The server 102 is programmed to next match each of the second list of areas with an area of the list of areas. Furthermore, the server 102 is programmed to determine, for each of the second list of areas, an action associated with the field corresponding to the matched area of the list of areas. In addition, the server 102 is programmed to cause, for each of the second list of areas, performance or an indication of performance of the determined action on the corresponding field of the second list of fields. In certain embodiments, the causing comprises locating the second form online and causing performance of the determined action on the corresponding field.

FIG. 4C illustrates yet another example process of automatically filling out forms. In some embodiments, in step 442, the server 102 is programmed or configured to receive a first electronic image of a first form.

In some embodiments, in step 444, the server 102 is programmed or configured to apply a digital model to the first electronic image, producing an identification of a first list of areas within the first electronic image as corresponding to a first list of form elements, including a first list of fields, and a context for each of the first list of fields in the first form. The context is related to a field label and a group label in the first list of form elements.

In some embodiments, in step 446, the server 102 is programmed or configured to match each of the first list of areas with an area of a second list of areas within a second electronic image of a second form. The second list of areas corresponds to a second list of form elements, including a second list of fields, and a context for each of the second list of fields in the second form.

In some embodiments, the matching comprises one or more of the following: whether a specific area of the first list of areas matches any area of the second list of areas, whether a context for a specific field corresponding the specific area matches a context for a field corresponding to any area of the second list of areas, whether a specific location of the specific area matches a location of any area of the second list of areas and whether specific text extracted from the specific area matches text extracted from any area of the second list of areas, or whether a specific portion of source code used to render the first form matches any portion of source code used to render the second form.

In some embodiments, in step 448, the server 102 is programmed or configured to determine, for each of the first list of areas, an action associated with the field corresponding to the matched area of the second list of areas.

In some embodiments, in step 450, the server 102 is programmed or configured to cause, for each of the first list of areas, performance or an indication of performance of the determined action on the corresponding field of the first list of fields.

In some embodiments, the determining comprises identifying a sequence in which to perform the determined actions, and the causing comprises including performance or an indication of performance of the determined actions in the identified sequence.

In some embodiments, the causing comprises generating an enhanced image for the first electronic image that indicates performance of the determined actions on the first list of fields. The server 102 can be programmed to further transmit the enhanced image to a client computer.

In some embodiments, the server 102 is programmed to further receive feedback data indicating a corrected action for a certain field of the first list of fields from the client computer. The server 102 can be programmed to then generate an updated image for the first electronic image that indicates performance of the corrected action on the certain field and transmitting the updated image to the client computer.

6. Hardware Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
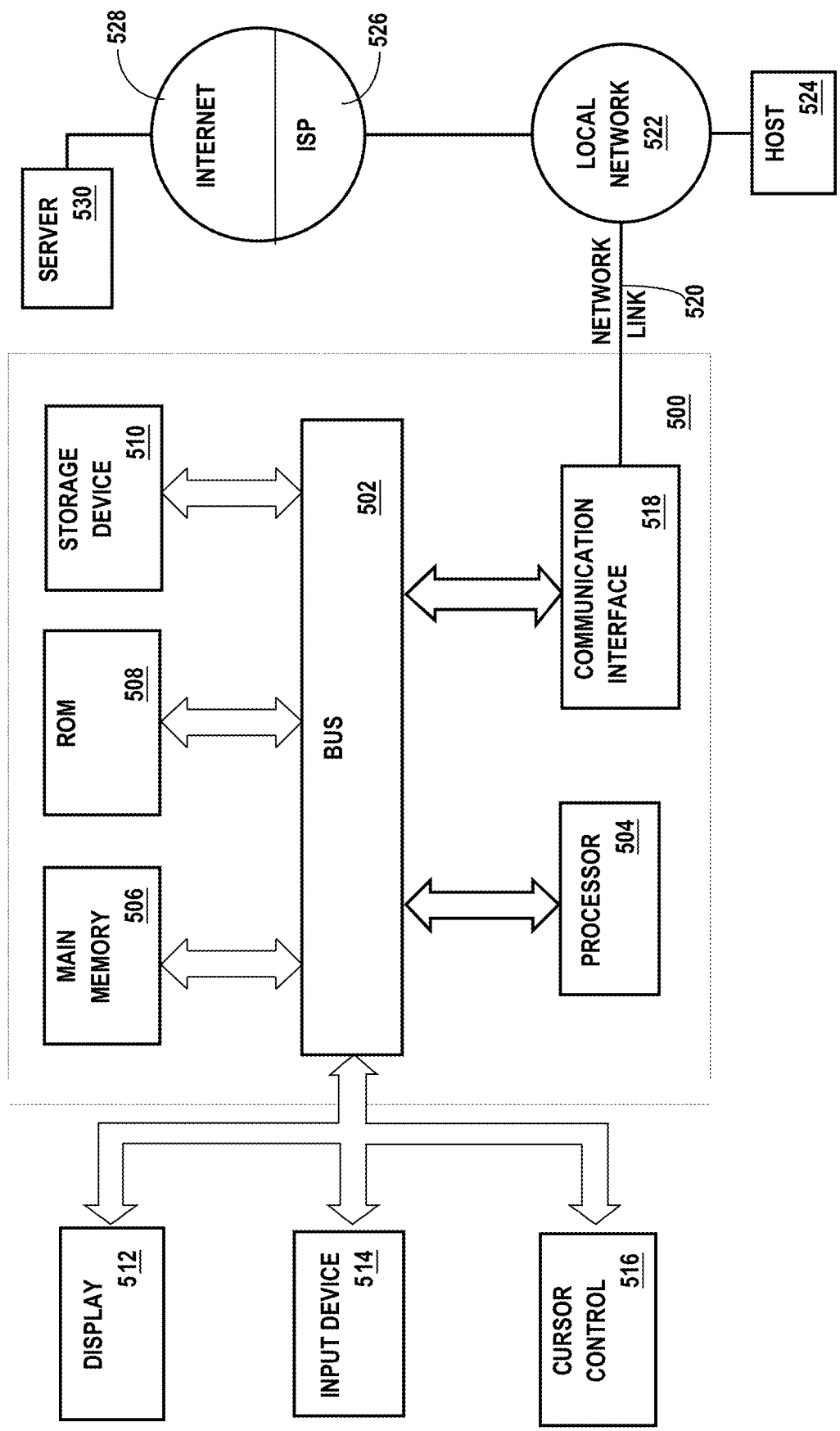
FIG. 5 is a block diagram that illustrates a computer system upon which an embodiment of the invention may be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction

What is claimed is:

1. A computer-implemented method of automatically filling out forms, comprising:
   receiving a first electronic image of a first form;
   applying a digital model to the first electronic image, producing an identification of a first list of areas within the first electronic image as corresponding to a first list of form elements, including a first list of fields, and a context for each of the first list of fields in the first form, the context being related to a field label and a group label in the first list of form elements;
   matching each of the first list of areas with an area of a second list of areas within a second electronic image of a second form,
      the second list of areas corresponding to a second list of form elements, including a second list of fields, and a context for each of the second list of fields in the second form;
   determining, for each of the first list of areas, an action associated with the field corresponding to the matched area of the second list of areas;
   generating an enhanced image for the first electronic image that indicates performance of the determined actions on the first list of fields;
   transmitting the enhanced image to a client computer;
   receiving feedback data indicating a corrected action for a certain field of the first list of fields from the client computer;
   generating an updated image for the first electronic image that indicates performance of the corrected action on the certain field.

2. The computer-implemented method of claim 1, the digital model representing each field, field label, and group label in the first form with a feature vector.

3. The computer-implemented method of claim 1, the first list of fields including a field that corresponds to a radio button, a check box, a drop-down list, a file upload option, or a calendar tool.

4. The computer-implemented method of claim 1, further comprising
   determining a type for each of the first list of fields,
   the action determined for an area corresponding to a field of the first list of fields being providing a correction of an identification of the area as corresponding to the field that has a certain type.

5. The computer-implemented method of claim 4, the correction indicating that the area does not correspond to the field or that the field has a different shape, type, or context.

6. The computer-implemented method of claim 1, the action being filling in the field or providing a specification of how to fill in the field.

7. The computer-implemented method of claim 1, the action indicating how to fill in the field via a mouse input, a keyboard input, a lookup from a database table, a computation from a value of another field, or an extraction from a specific image.

8. The computer-implemented method of claim 1, further comprising, in response to receiving the feedback data, causing displaying a list of input possible actions for filling in the certain field.

9. The computer-implemented method of claim 1,
the determining comprising identifying a sequence in which to perform the determined actions,
the generating the enhanced image comprising including performance or an indication of performance of the determined actions in the identified sequence.

10. The computer-implemented method of claim 1, further comprising:
receiving a second electronic image of the second form;
applying the digital model to the second electronic image, producing an identification of a second list of areas within the second electronic image as corresponding to a second list of fields and a context for each of the second list of fields in the second form,
the context comprising a field label and a group label in the second form;
causing presenting a graphical user interface (GUI) corresponding to the form,
the GUI including a list of regions corresponding to the second list of areas in the form,
in response to receiving a request to interact with a region of the list of regions corresponding to an area of the second list of areas and field of the second list of fields, the GUI being configured for,
highlighting regions of the list of regions corresponding to a context for the field, and
recording information related to an action associated with the area or the field.

11. The computer-implemented method of claim 1, further comprising transmitting the enhanced image to the client computer.

12. A system for automatically filling out forms, comprising:
one or more processors;
one or more memories storing computer-implemented instructions which when executed cause the one or more processors to perform a method, the method comprising:
receiving a first electronic image of a first form;
applying a digital model to the first electronic image, producing an identification of a first list of areas within the first electronic image as corresponding to a first list of form elements, including a first list of fields, and a context for each of the first list of fields in the first form, the context being related to a field label and a group label in the first list of form elements;
matching each of the first list of areas with an area of a second list of areas within a second electronic image of a second form,
the second list of areas corresponding to a second list of form elements, including a second list of fields, and a context for each of the second list of fields in the second form;
determining, for each of the first list of areas, an action associated with the field corresponding to the matched area of the second list of areas;
generating an enhanced image for the first electronic image that indicates performance of the determined actions on the first list of fields;
transmitting the enhanced image to a client computer;
receiving feedback data indicating a corrected action for a certain field of the first list of fields from the client computer;
generating an updated image for the first electronic image that indicates performance of the corrected action on the certain field.

13. The system of claim 12, the method further comprising determining a type for each of the first list of fields based on the corresponding area as an image or a portion of source code used to render the first electronic image.

14. The system of claim 12, the method further comprising:
receiving a second electronic image of the second form;
applying the digital model to the second electronic image, producing an identification of a second list of areas within the second electronic image as corresponding to a second list of fields and a context for each of the second list of fields in the second form,
the context comprising a field label and a group label in the second form;
causing presenting a graphical user interface (GUI) corresponding to the form,
the GUI including a list of regions corresponding to the second list of areas in the form,
in response to receiving a request to interact with a region of the list of regions corresponding to an area of the second list of areas and a field of the second list of fields, the GUI being configured for:
highlighting regions of the list of regions corresponding to a context for the field, and
recording information related to an action associated with the area or the field.

15. The system of claim 14, the generating the enhanced image comprising:
locating the second form online;
causing performance of the determined action on the corresponding field.

16. The system of claim 12,
the determining comprising identifying a sequence in which to perform the determined actions,
the generating the enhanced image comprising including performance or an indication of performance of the determined actions in the identified sequence.

17. The one or more non-transitory storage media of claim 16, the method further comprising:
transmitting the updated image to the client computer.

18. The system of claim 16, the determining being based on
form data for each of the second list of areas, including a type of a form element, a type of a field, a portion of the corresponding area, text extracted from the corresponding area, a location of the corresponding area, or a shape of the corresponding area,
action data for each of the second list of areas, including an index of the determined action or a source of input data to be entered into the field.

19. One or more non-transitory storage media storing instructions which, when executed by one or more computing devices, cause performance of a method of automatically filling out forms, the method comprising:
receiving a first electronic image of a first form;
applying a digital model to the first electronic image, producing an identification of a first list of areas within the first electronic image as corresponding to a first list of form elements, including a first list of fields, and a context for each of the first list of fields in the first form, the context being related to a field label and a group label in the first list of form elements;

matching each of the first list of areas with an area of a second list of areas within a second electronic image of a second form,
  the second list of areas corresponding to a second list of form elements, including a second list of fields, and a context for each of the second list of fields in the second form;
determining, for each of the first list of areas, an action associated with the field corresponding to the matched area of the second list of areas;
generating an enhanced image for the first electronic image that indicates performance of the determined actions on the first list of fields;
transmitting the enhanced image to a client computer;
receiving feedback data indicating a corrected action for a certain field of the first list of fields from the client computer;
generating an updated image for the first electronic image that indicates performance of the corrected action on the certain field.

20. The one or more non-transitory storage media of claim 19, the matching comprising determining one or more of the following:

whether a specific area of the first list of areas matches any area of the second list of areas, whether a context for a specific field corresponding the specific area matches a context for a field corresponding to any area of the second list of areas, whether a specific location of the specific area matches a location of any area of the second list of areas and whether specific text extracted from the specific area matches text extracted from any area of the second list of areas, or whether a specific portion of source code used to render the first form matches any portion of source code used to render the second form.

21. The one or more non-transitory storage media of claim 19, the determining comprising identifying a sequence in which to perform the determined actions, the generating the enhanced image comprising including performance or an indication of performance of the determined actions in the identified sequence.

* * * * *